United States Patent
Suzuki

(10) Patent No.: US 8,661,529 B2
(45) Date of Patent: Feb. 25, 2014

(54) INFORMATION PROCESSING DEVICE

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 13/332,831

(22) Filed: Dec. 21, 2011

(65) Prior Publication Data

US 2012/0174211 A1 Jul. 5, 2012

(30) Foreign Application Priority Data

Jan. 4, 2011 (JP) ................. 2011-000278

(51) Int. Cl.
*H04L 29/06* (2006.01)
*G06F 7/04* (2006.01)
*G06F 21/60* (2013.01)

(52) U.S. Cl.
CPC .......... *H04L 63/0838* (2013.01); *G06F 21/608* (2013.01)
USPC .................. 726/18; 726/19; 726/20; 726/21; 726/22; 726/23; 713/168; 713/169; 713/170; 713/171; 713/172

(58) Field of Classification Search
CPC ........................ H04L 63/0838; G06F 21/608
USPC ......................................................... 726/18
See application file for complete search history.

(56) References Cited

U.S. PATENT DOCUMENTS

| 7,308,572 B2* | 12/2007 | Goh et al. ...................... 713/152 |
| 8,347,355 B2* | 1/2013 | Mower et al. ..................... 726/3 |
| 2005/0010809 A1 | 1/2005 | Hayano |
| 2010/0014110 A1 | 1/2010 | Munetomo |
| 2011/0181910 A1 | 7/2011 | Suzuki |

FOREIGN PATENT DOCUMENTS

| JP | 2004-338295 | 12/2004 |
| JP | 2005-004400 | 1/2005 |
| JP | 2005-284876 | * 10/2005 |
| JP | 2006-235757 | 9/2006 |
| JP | 2008-155374 | 7/2008 |
| JP | 2008-311895 | 12/2008 |
| JP | 2010-044744 | 2/2010 |

* cited by examiner

*Primary Examiner* — Longbit Chai
(74) *Attorney, Agent, or Firm* — IPUSA, PLLC

(57) ABSTRACT

An information processing device includes a processing unit which performs user authentication. The processing unit includes a setting part that determines setting of operation of a target device using the user authentication. An authentication information setting part determines user authentication information. A password generation part generates a one-time password partially or fully. A transmission part transmits the setting of operation of the target device and the one-time password to the target device.

6 Claims, 12 Drawing Sheets

FIG.1 RELATED ART
(A)
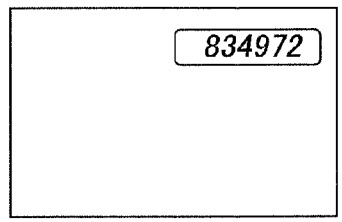
(B)
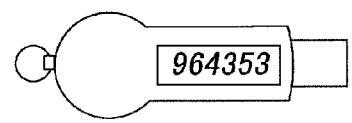
(C)
(d)
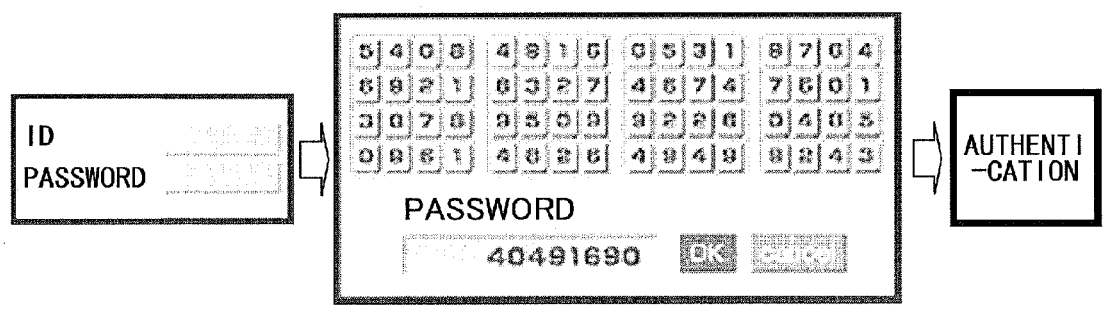

FIG.6

| USER ID | USER NAME | LOGIN USER NAME | LOGIN PASSWORD | OTP USE PERMISSION | KIND OF OTP | AUTHORITY | MAIL ADDRESS |
|---|---|---|---|---|---|---|---|
| 0 | ADMINISTRATOR | Admin | jFpRx134 | OK | TN1 | CPFSM | admin@x.jp |
| 1 | AIDA | Aida | 1231 | OK | TN | CPFSM | aida@x.jp |
| 2 | IIDA | Iida | 1111 | OK | TN | CPF | iida@x.jp |
| 3 | UCHIDA | Uchida | | OK | TN | CPFS | uchida@ |
| 4 | EDA | Eda | YzKc02 | OK | TN | CPFS | eda@x.jp |
| 5 | ODA | Oda | | OK | TN | P | oda@x.jp |
| 6 | KATOH | Katoh | 3232 | OK | TN | CPFS | katoh@x.jp |
| 7 | KITOH | Kitoh | 123456 | OK | TN | CPFS | kitoh@x.jp |
| 8 | KUDOH | Kudoh | Abeck | OK | T | CPFS | kudoh@x.jp |
| 9 | KENMOCHI | Kenmochi | ###### | OK | T | CPFS | kenmot@x.jp |
| 10 | KONDOH | Kondoh | 1234 | OK | T | CPFS | kondoh@x.jp |
| 11 | SATOU | Satou | 4444 | OK | 1N | PFS | satoh@x.jp |
| 12 | SHIMIZU | Shimizu | 9876 | OK | 1N | PFS | shimz@x.jp |
| 13 | SUZUKI | Suzuki | | OK | 1N | P | suzuki@x.jp |
| 14 | SETA | Seta | Setaa | OK | 1 | PFS | seta@x.jp |
| 15 | SORIMATI | Sorimati | S1234 | OK | 1 | P | sorimat@x.jp |
| 99 | GUEST | guest | | OK | T | CP | guest@x.jp |

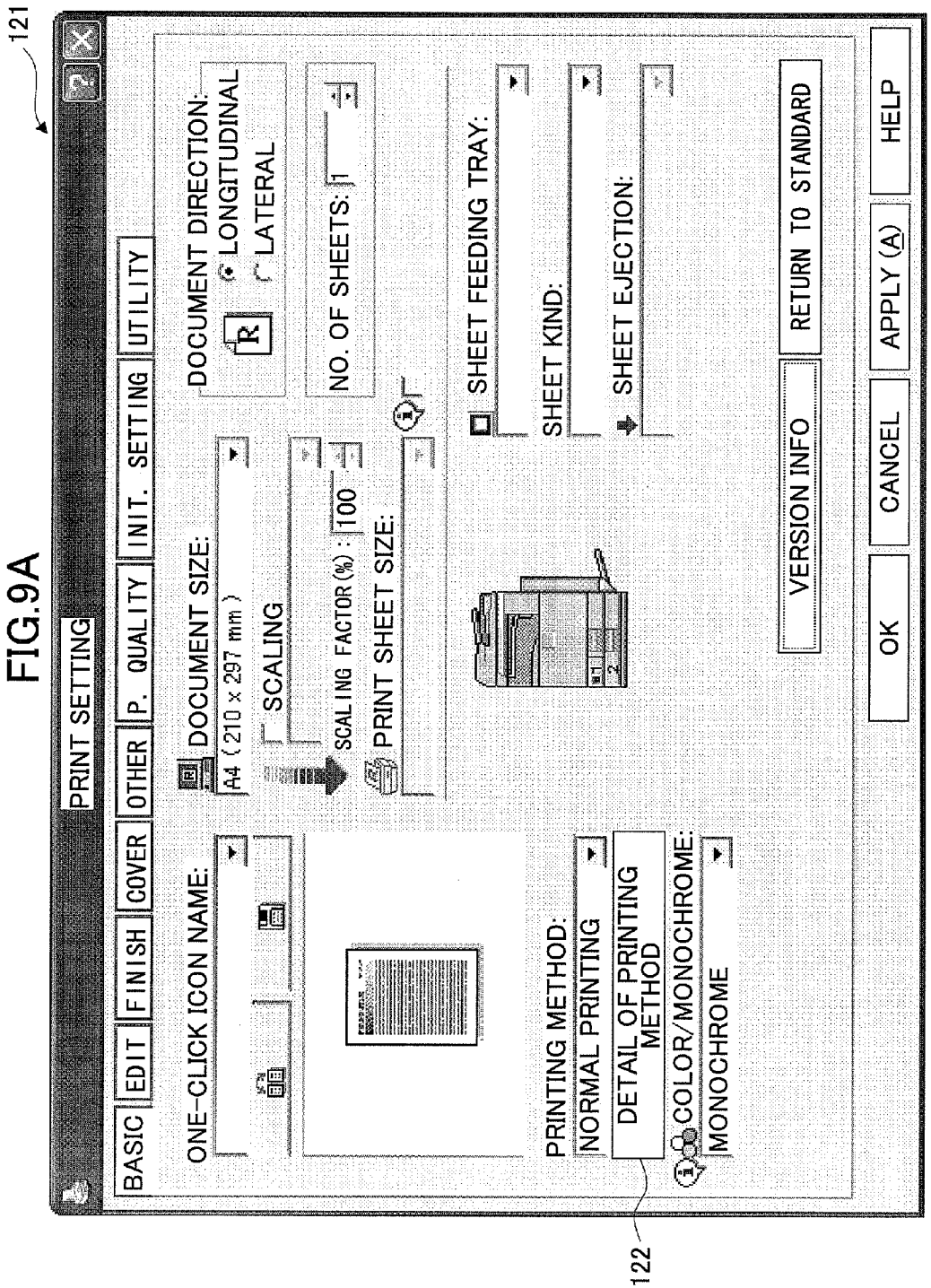

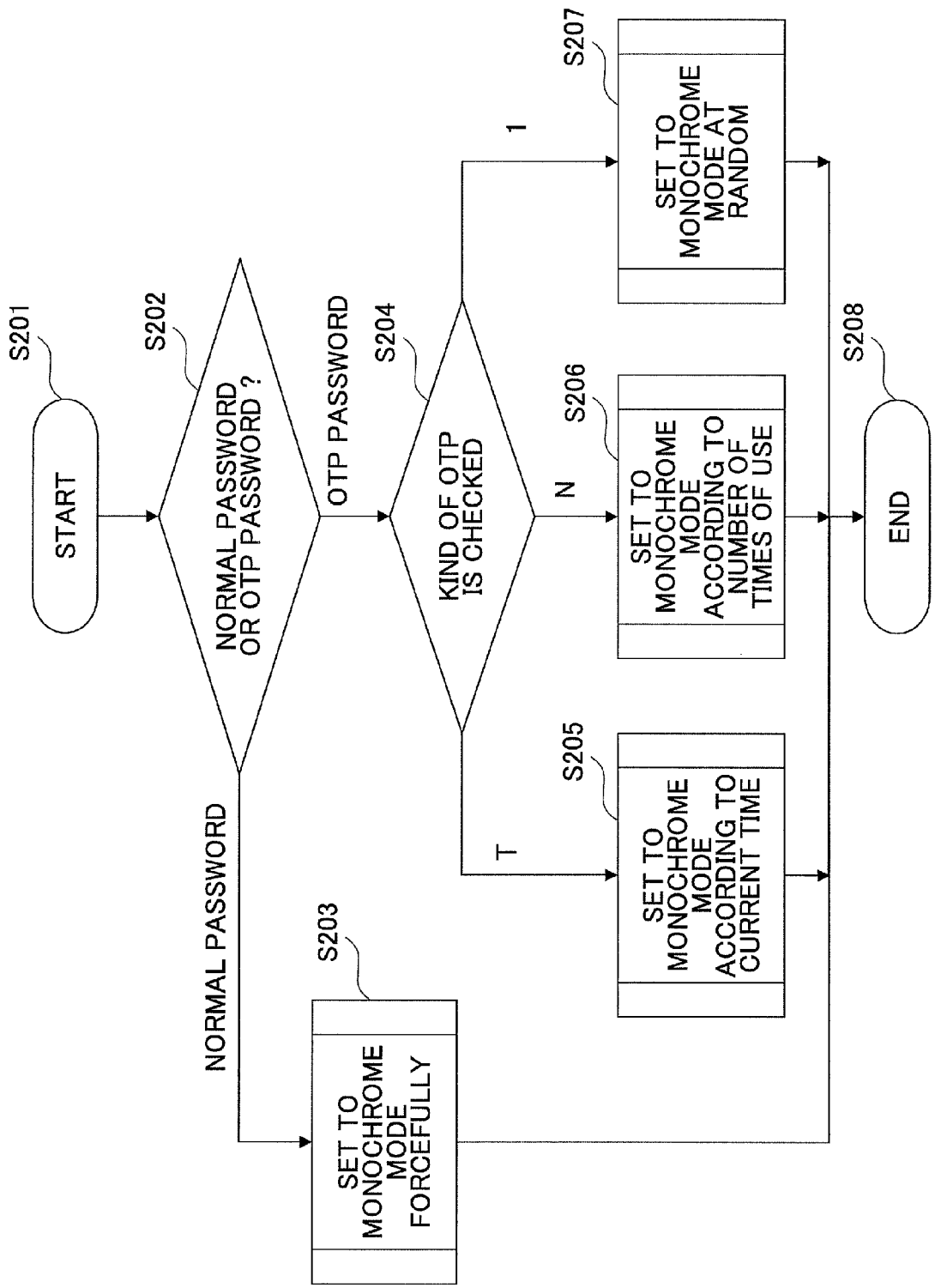

INFORMATION PROCESSING DEVICE

BACKGROUND OF THE INVENTION

1. Field of the Invention

The present disclosure relates to an information processing device which performs user authentication using a one-time password (OTP).

2. Description of the Related Art

Conventionally, in order to restrict use of a target device, such as an MFP (multi-function peripheral) or an LP (laser printer), user authentication is performed before using the target device. A well-known method of authenticating such a user is to prompt the user to perform a manual input operation to directly input a user name (user ID) and a password or insert a card medium in which a user name (user ID) and a password are stored.

The user authentication is aimed for preventing unauthorized use of target devices. In many cases, a one-time password (OTP) is used for authentication of a temporary user. The one-time password is a password which changes, each time the password is used, unlike a normal password which is changeless and fixed at all times. The OTP automatically changes for each time or at each of intervals of a fixed time. Accordingly, prediction of the OTP is difficult and a high level of security is provided.

FIG. 1 is a diagram showing an example of hardware and software modules according to the related art needed for generation of a one-time password. A one-time password generation/display device, called a hardware token, is shown in FIGS. 1 (a) and (b). Specifically, a card type token is shown in FIG. 1 (a) and a USB (universal serial bus) type token is shown in FIG. 1 (b).

Each of these tokens includes a display unit, and a one-time password present in the display unit is used when using a target device. The hardware token of this kind contains an internal clock, and a one-time password is generated by performing predetermined computations based on a current time output from the clock.

An example of a screen displayed by a software module of a software token executed on a PC (personal computer) is shown in FIG. 1 (c). A user views a one-time password (OTP) present in the screen and may perform a manual input operation. Alternatively, the user may press a "Copy" button in the screen to copy the OTP to a clipboard, and subsequently paste the same to a password input column in a screen provided by a printer driver.

Further, examples of screens displayed by a web service module (which is called a matrix authentication) using a challenge and response system and executed on a PC are shown in FIG. 1 (d). If a user inputs a user ID and a normal password in a left-hand screen of FIG. 1 (d), a primary authentication is performed by a server. After the primary authentication is performed, the data (a challenge) from the server is received at the PC and a central screen of FIG. 1 (d) in which a matrix of numbers is arranged is displayed. If the user selects a set of numbers on the central screen in accordance with a pattern registered beforehand in the server, the content (one-time password) is transmitted to the server as a response, so that final user authentication is performed at the server by comparing the transmitted response with a collating response generated on the server.

Thus, the generation of a one-time password according to the related art requires preparation of a dedicated hardware, software or web service module.

FIG. 2A and FIG. 2B are diagrams for explaining an example of an input operation to input a user name and a password in a printer driver according to the related art. If a printing request from an application program, such as a word-processing program, is output and a property setting of an MFP or a printer is selected, a print setting screen 121 shown in FIG. 2A is displayed. If a user presses a "detail of printing method" button 122 in the print setting screen 121, a user authentication screen 123 shown in FIG. 2B is displayed.

In the user authentication screen 123, a user name is input to a login user name input column 124, a one-time password, acquired by any of the above-described methods shown in FIG. 1, is input to a login password input column 125, and a "OK" button 126 is pressed, so that a user authentication is performed.

As described above, according to the related art, in order to generate a one-time password, a dedicated hardware, software or web service module has to be prepared separately, and there is a problem that the distribution and management of such a module is complicated. Conventionally, a one-time password is prepared for a temporary user and use of the one-time password is limited to a restrictive use.

On the other hand, Japanese Laid-Open Patent Publication No. 2008-155374 discloses an image forming device adapted for preventing a third party from acquiring authentication information, such as a password, by an unauthorized access to a computer. In this image forming device, a password generated by a password generation part of the image forming device is transmitted to a computer, and a user inputs the password to the image forming device. Even when the image forming device is in an idle state, unauthorized acquisition of the password by a third party is prevented and the security of printing in the image forming device is improved.

Japanese Laid-Open Patent Publication No. 2006-235757 discloses a data processing device having a user authentication function. This user authentication function is used to authenticate a first user which has a use authority of the device. The user authentication function is used to display a setting screen of a temporary use authority to be applied to a second user which has no use authority of the device when the user logs in. Through the setting screen which is set by the first user, the temporary use authority is applied to the second user in an extent permitted by the first user.

However, in each of the devices according to and Japanese Laid-Open Patent Publication Nos. 2008-155374 and 2006-235757, to use the device, the user must acquire a one-time password generated by a dedicated software module which is separately prepared. There is a problem that the distribution and management of the separately prepared module is complicated.

SUMMARY OF THE INVENTION

In one aspect, the present disclosure provides an information processing device which is able to use a one-time password for a wide variety of applications without separately preparing a dedicated hardware, software or web service module.

In an embodiment which solves or reduces one or more of the above-described problems, the present disclosure provides an information processing device including a processing unit which performs user authentication, the processing unit including: a setting part configured to determine setting of operation of a target device using the user authentication; an authentication information setting part configured to determine user authentication information; a password generation part configured to generate a one-time password partially or fully; and a transmission part configured to transmit the setting of operation of the target device and the one-time password to the target device.

Other objects, features and advantages of the present disclosure will become more apparent from the following detailed description when read in conjunction with the accompanying drawings.

BRIEF DESCRIPTION OF THE DRAWINGS

FIG. 1 is a diagram for explaining an example of hardware and software modules according to the related art needed for generation of a one-time password.

FIG. 6 is a diagram for explaining an example of a data structure of an address book.

FIG. 9A and FIG. 9B are diagrams for explaining an example of an input operation to input a user name and a password in a printer driver of the user terminal device of the present embodiment.

FIG. 10 is a flowchart for explaining a function setting process performed by a driver of the user terminal device of the present embodiment.

DETAILED DESCRIPTION OF THE PREFERRED EMBODIMENTS

A description will be given of embodiments of the present disclosure with reference to the accompanying drawings.

Figure 2A:
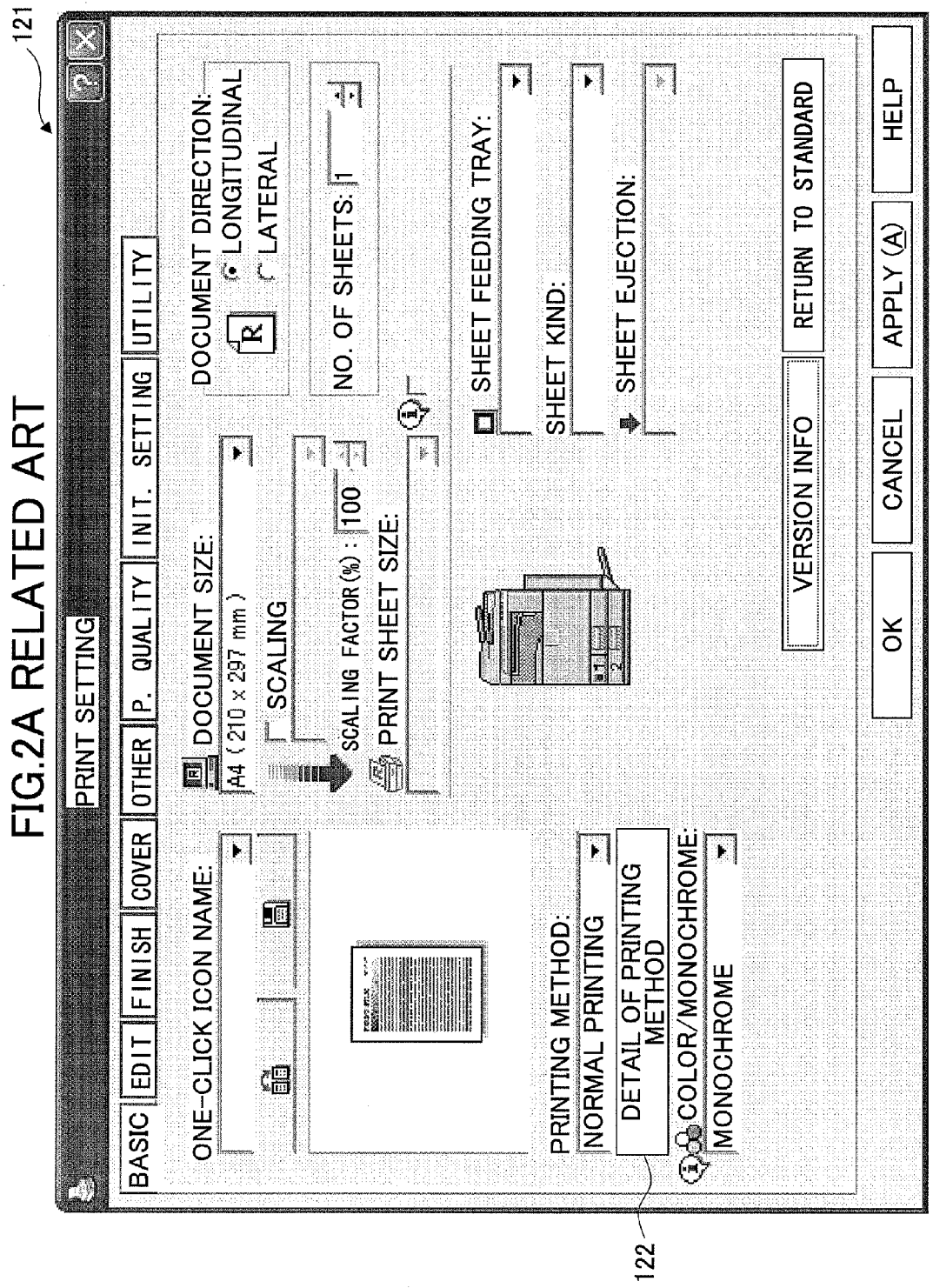
FIG. 2A and FIG. 2B are diagrams for explaining an example of an input operation to input a user name and a password in a printer driver according to the related art.
Figure 2B:
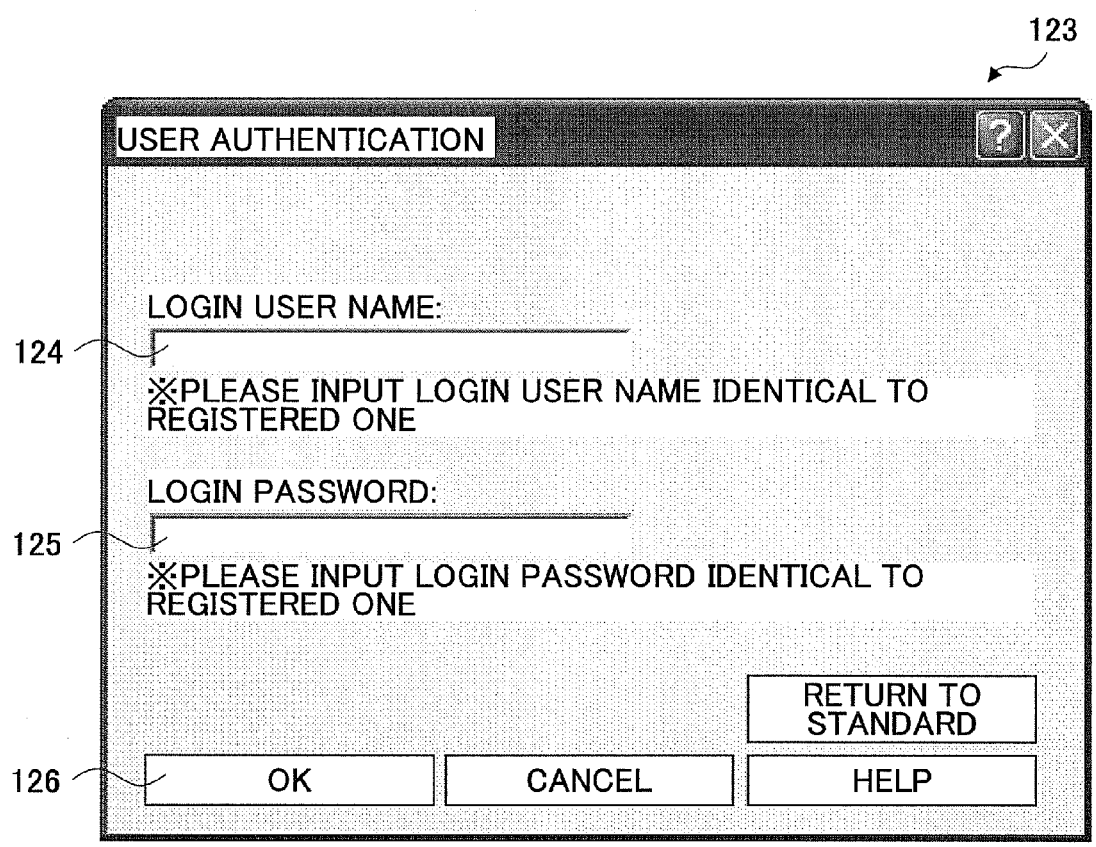
Figure 3:
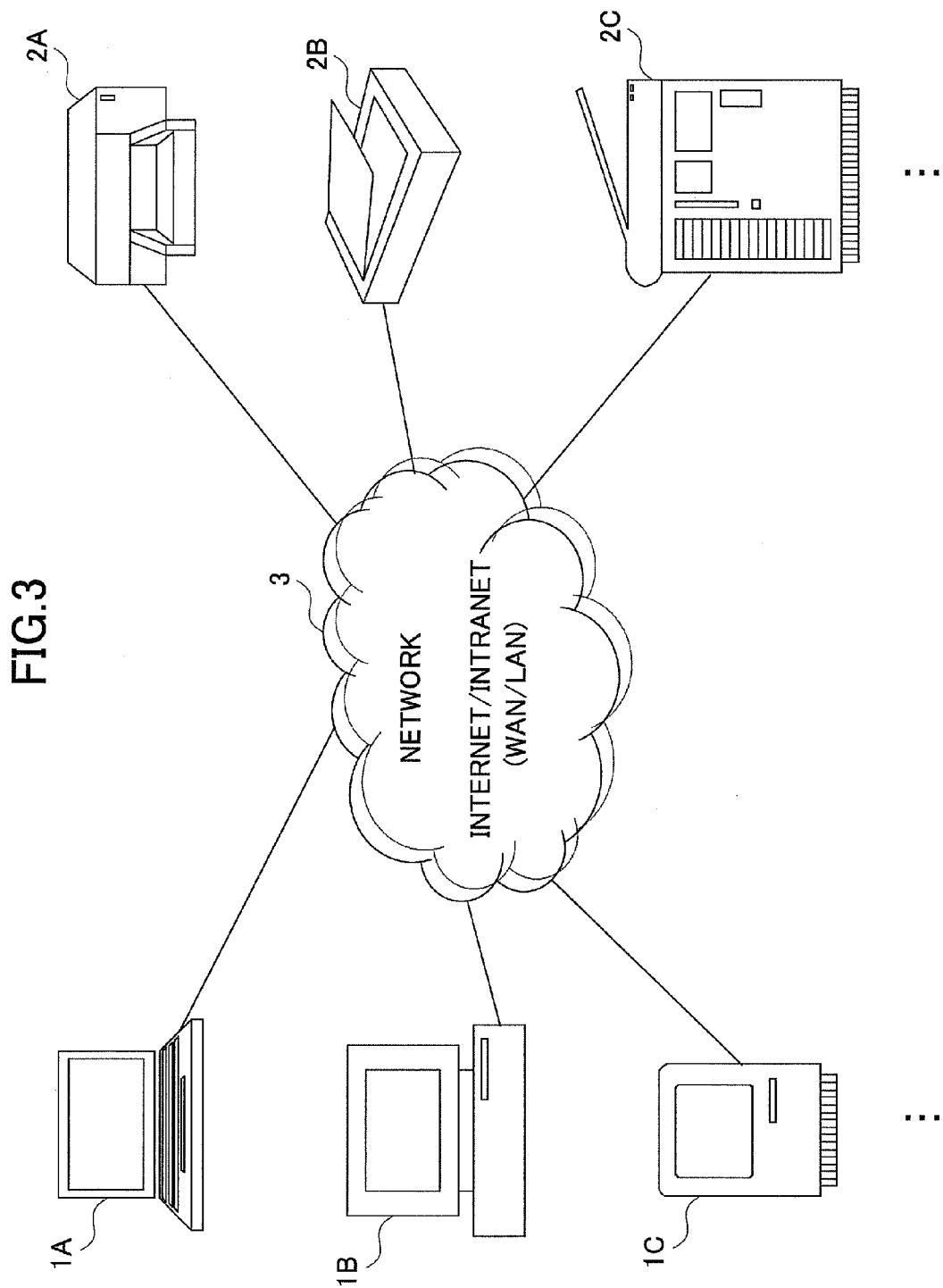
FIG. 3 is a diagram showing the composition of a system to which an information processing device of an embodiment of the present disclosure is applied.

FIG. 3 is a diagram showing the composition of a system to which an information processing device of an embodiment of the present disclosure is applied.

In the system shown in FIG. 3, user terminal devices 1A, 1B, 1C, . . . , such as PCs or servers, and target devices 2A, 2B, 2C, . . . , such as printers, scanners, MFPs, routers, switches or servers, are interconnected via a network 3, such as the Internet or an Intranet. In each of the user terminal devices 1A, 1B, 1C, . . . , drivers for using the target devices 2A, 2B, 2C, . . . are installed respectively, and, when using any of the target devices 2A, 2B, 2C, . . . , each user terminal device uses the installed driver to control operation of the target device. Each of the target devices 2A, 2B, 2C, . . . has a function to recognize a one-time password from the user terminal devices 1A, 1B, 1C, . . . based on a predetermined rule.

Figure 4:
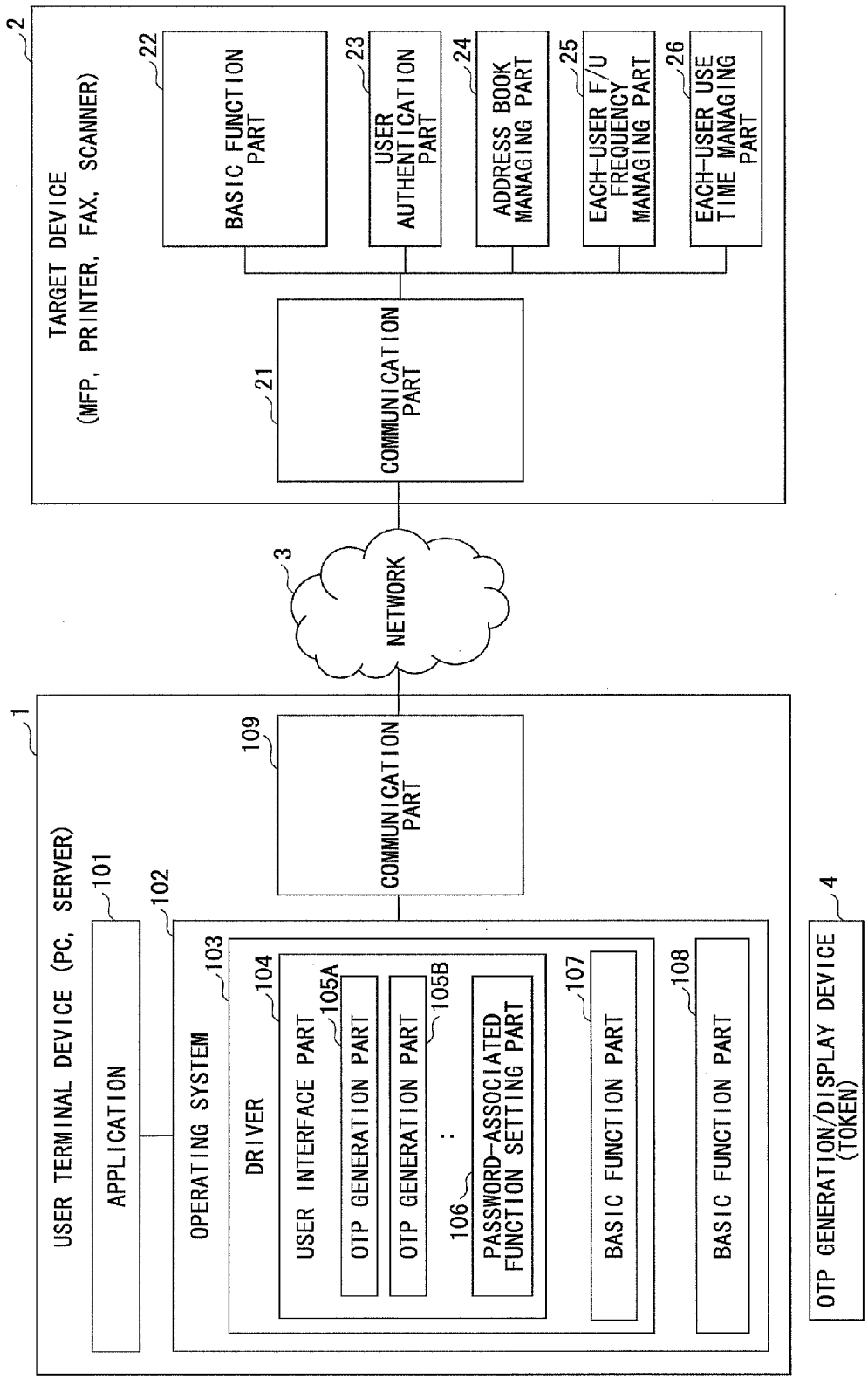
FIG. 4 is a diagram showing the composition of a user terminal device and a target device.

FIG. 4 is a diagram showing the composition of a user terminal device 1 and a target device 2. As shown in FIG. 4, the user terminal device 1 (1A, 1B, 1C, . . . ) includes an application 101 to perform a document preparation, etc., an operating system 102 to manage the basic operations of the user terminal device, and a communication part 109 to communicate with the target device 2 via the network 3.

The operating system 102 includes a driver 103 which controls operation of the target device 2, and a basic function part 108 which performs other basic operations of the user terminal device as the operating system.

The driver 103 includes a user interface part 104 which determines setting of operating conditions of the target device 2 by interactively communicating with a user, and a basic function part 107 which performs basic operations as the driver. The user interface part 104 includes a plurality of one-time password generation parts 105A, 105B, . . . which generate one-time passwords by different methods respectively, and a password-associated function setting part 106 which changes an operating condition of the target device 2 depending on whether a normal password or a one-time password is used.

When using the user terminal device 1, the user may use a one-time password which is generated by a one-time password (OTP) generation/display device (token) 4. A token is a device that may be used to authenticate a user.

On the other hand, the target device 2 (2A, 2B, 2C, . . . ) includes a communication part 21 which performs communication with the user terminal device 1 via the network 3, a basic function part 22 which performs basic operations of the target device, and a user authentication part 23 which performs user authentication to authenticate the user with a one-time password or a normal password, etc.

The target device 2 further includes an address book managing part 24 which stores user Information as an address book, an each-user function use frequency managing part 25 which manages the frequency (the number of times) of use of the target device 2 for every user, and an each-user use time managing part 26 which manages the use time of the target device 2 for every user. Alternatively, the user authentication part 23 may be arranged in an authentication server (not shown) which is separate from the target device 2, rather than in the target device 2.

Figure 5:
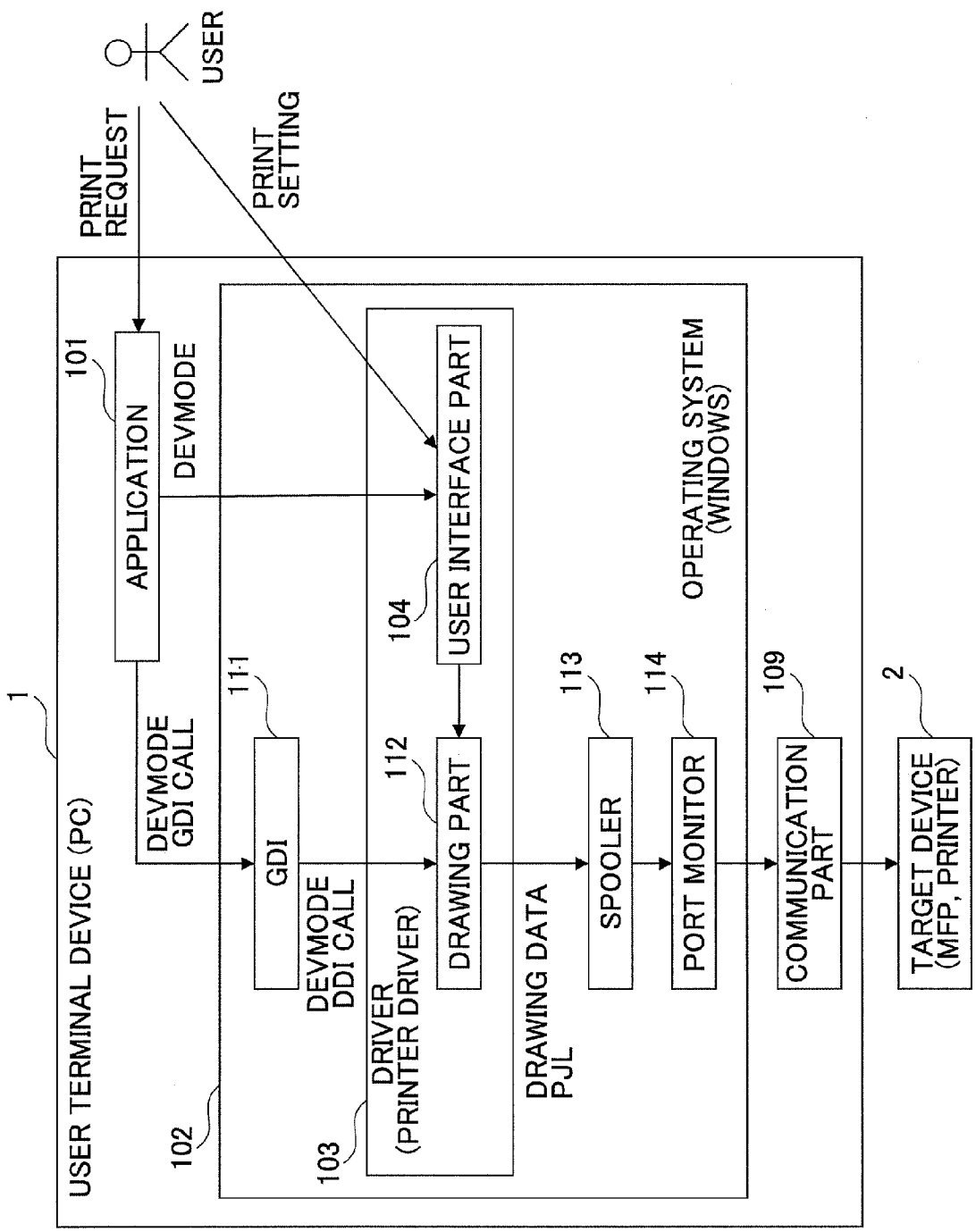
FIG. 5 is a diagram showing the composition of a user terminal device in which Microsoft Windows is implemented as an operating system.

FIG. 5 is a diagram showing the composition of a user terminal device 1 in which Microsoft Windows is implemented as the operating system. It is assumed in FIG. 5 that the target device 2 is an MFP or a printer and the driver 103 is a printer driver.

As shown in FIG. 5, when a print request from the user is received, the application 101 transmits a DEVMODE activate request to the user interface part 104 of the driver 103 and starts operation of the user interface part 104 which enables the user to determine the setting of the print conditions. The user interface part 104 converts the print conditions determined by the user into data in the format that is recognizable to the operating system 102 or the target device 2.

Further, the application 101 transmits the DEVMODE and a GDI call to the GDI (graphic device interface) 111 of the operating system 102. The print data is transferred from the GDI 111 to the drawing part 112 of the driver 103. The drawing part 112 generates drawing data from the print data in accordance with the print conditions, and transmits the drawing data to the communication part 109 through the spooler 113 and the port monitor 114 together with the print conditions. The drawing data and the print conditions are transmitted from the communication part 109 to the target device 2. The operating system 102 controls the spooler 113 so that data is transmitted to the target device 2 via the port monitor 114 at an appropriate timing that the target device 2 is not busy.

Authentication information, including a user ID and a password, may be contained in the print conditions, and the printing job may be set as requiring the user to perform user authentication before printing the drawing data. The user authentication is performed on the target device before printing. If the user authentication is not performed successfully, the printing is not started by the target device 2 and an error message is returned to the user terminal device 1 or displayed on the operation panel of the main part of the target device 2.

FIG. 6 is a diagram showing an example of a data structure of an address book stored in the user authentication part 23 of the target device 2. The address book is composed of a number of user records, and each record contains items, including "user ID", "user name", "login user name", "login password", "OTP use permission", "kind of OTP", "authority" and "mail address".

Each user notifies a user name identical to the "login user name" of the address book and a password identical to the "login password" of the address book to the target device, and receives use permission of the target device. When the "OTP use permission" is registered in the address book, the user can use the "one-time password" instead of the "login password". When no "login password" is registered, the user may use a "one-time password". When use of "login password" is found vulnerable, the setting of the use of "login password" may be automatically stopped and the setting may be forcefully changed to use of "one-time password".

There are some kinds of "one-time passwords" which are stored in the address book. One kind of "one-time password" is determined depending on the current time or use time. Another kind of "one-time password" is determined depending on a predetermined random number. The "one-time password" determined may be partially or fully used.

In this example, "T" which is listed in the item "kind of OTP" of the address book denotes the kind of "one-time password" which is determined depending on the current time, start time or use time. "N" denotes the kind of "one-time password" which is determined depending on the number of times of use of the target device. "1" denotes the kind of "one-time password" which is determined by a part of a random number sequence. A fixed password may also be added to a "one-time password". In that case, a fixed password is entered followed by or preceded by the generated one-time password.

In addition, a one-time password based on the use record (log) or the use count of the device or a specific function of the device, which is stored for every user, may also be considered as the one-time password determined depending on the number of times of use of the target device. Further, another kind of "one-time password" is determined depending on an IP address (location) of the user terminal device 1 or the target device 2.

By the item "authority" of the address book, use permission of all or a part of a copier, a printer, a facsimile, a scanner, and a management function of the target device is distinguished. In this example, "C" denotes use permission of a copier, "P" denotes user permission of a printer, "F" denotes use permission of a fax, "S" denotes use permission of a scanner, and "M" denotes use permission of a management function.

By the item "mail address" of the address book, the destination to which a notice of a job is sent or the destination to which data is transmitted is illustrated.

Figure 7:
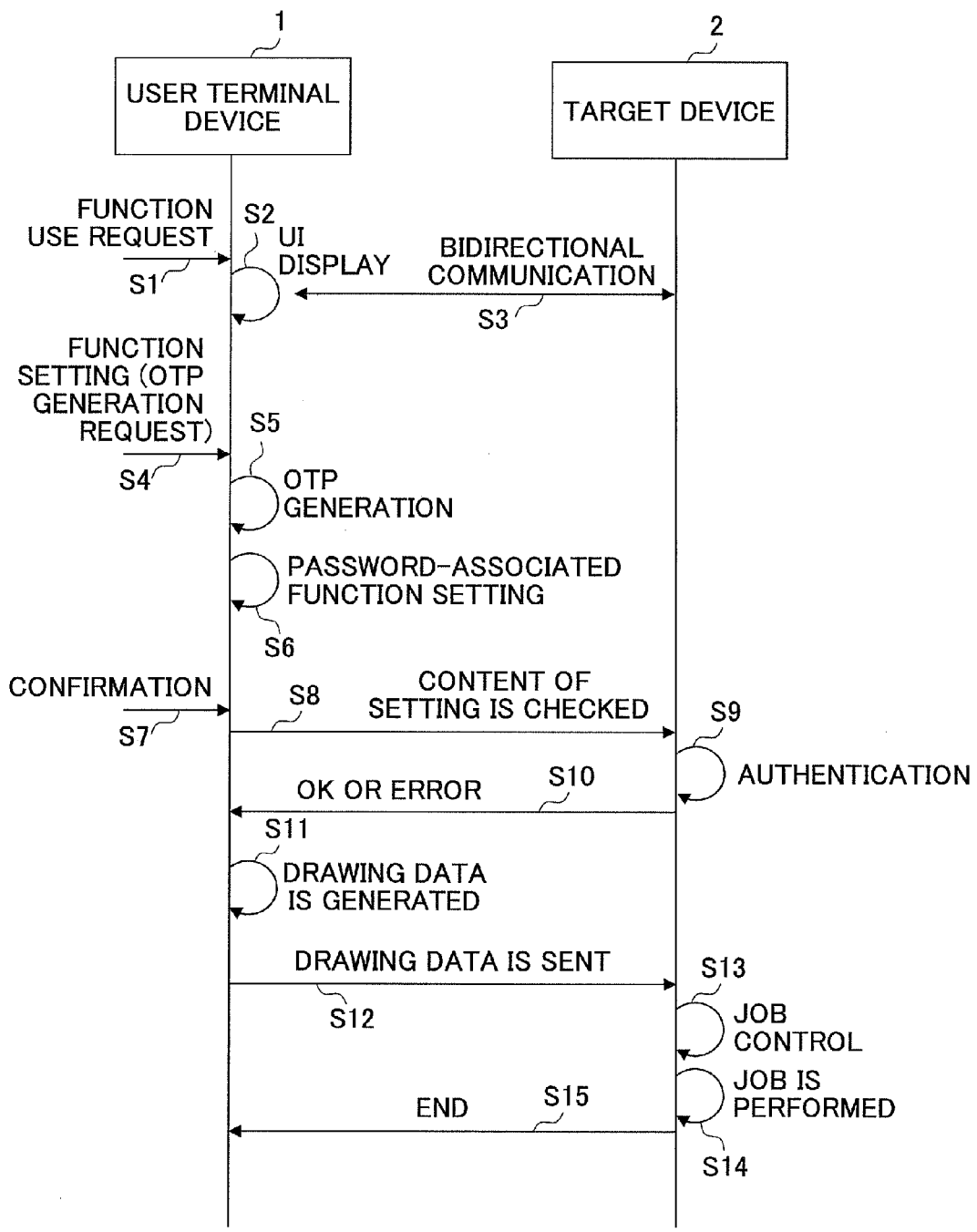
FIG. 7 is a sequence diagram for explaining a process performed by the user terminal device and the target device in the embodiment of FIG. 4.

FIG. 7 is a sequence diagram for explaining the function setting process performed by the user terminal device of the embodiment of FIG. 4. As shown in FIG. 7, if a user sends a function use request of a target device 2 to the application 101 of the user terminal device 1 (step S1), the user interface part 104 of the driver 103 displays a user interface (UI) screen, such as a function setting screen (step S2). At this time, in order to acquire the information on the target device 2, a bidirectional communication between the user terminal device 1 and the target device 2 is performed (step S3).

Subsequently, if the user sends a request of function setting including a request of generation of a one-time password to the user interface part 104 of the driver 103 (step S4), one of the one-time password generation parts 105A, 105B, ... of the user interface part 104 generates a one-time password (step S5). The algorithm of the one-time password generation at this time must be available to the user authentication part 23 on the side of the target device 2. If the one-time password at this time is a one-time password which is determined depending on the current time, synchronization may be required at the time of the bidirectional communication performed in the step S3. Other function settings may be determined according to a user's selection or a predetermined setting.

The password-associated function setting part 106 determines the password-associated function setting by interlocking with the user-entered password or the generated one-time password (step S6).

Subsequently, if the user checks the content of the function setting (step S7), the user interface part 104 transmits the content of the function setting to the target device 2 (step S8).

When the content of the function setting is received at the target device 2, the target device 2 causes the user authentication part 23 to perform user authentication based on the user ID, the one-time password, etc. which are contained in the content of the function setting (step S9), and returns to the user terminal device 1 a result of the user authentication indicating either a normal end (OK) or an error (step S10).

When the user authentication is performed normally, the application 101 of the user terminal device 1 generates data needed for the function use, such as print data, and the driver 103 converts the print data into drawing data (step S11) and transmits the drawing data to the target device 2 (step S12). At this time, the content of the function setting may be transmitted together with the drawing data.

In response to the drawing data received, the basic function part 22 of the target device 2 performs the job control (step S13), performs the job (step S14), and notifies an end of the job to the user terminal device 1 (step S15).

When the user authentication results in an error, the use of the function, such as printing, is cancelled by the job control. A notice indicating the cancellation is sent to the user on the user terminal device 1 and an error message is displayed on the operation panel of the target device 2.

Figure 8:
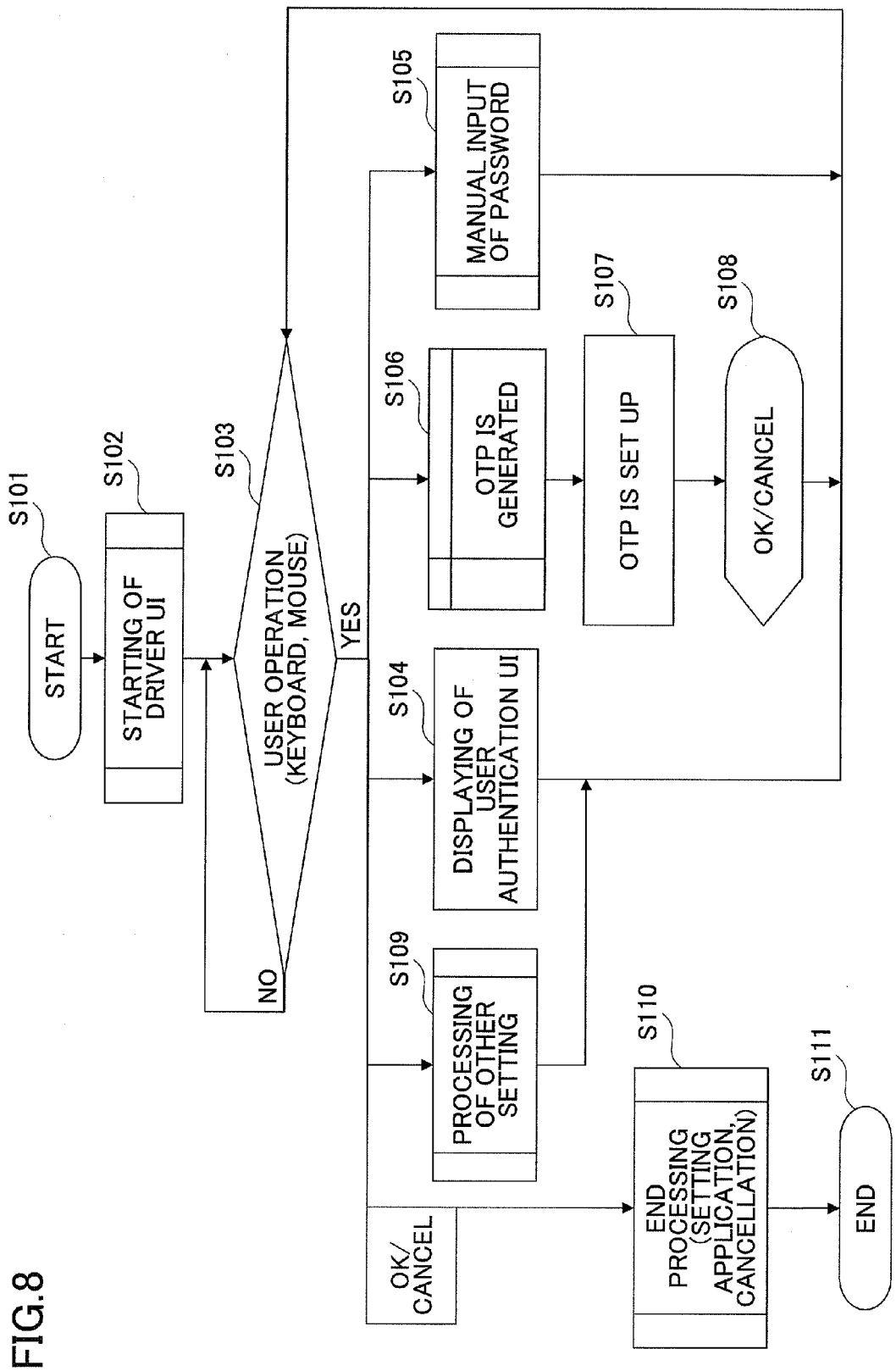
FIG. 8 is a flowchart for explaining a function setting process performed by a driver of the user terminal device of the present embodiment.

FIG. 8 is a flowchart for explaining a function setting process performed by the driver 103 of the user terminal device 1. As shown in FIG. 8, the function setting process is started upon receipt of a function use request from a user (step S101). The user interface part 104 of the driver 103 starts displaying a user interface, such as a function setting screen (step S102).

Figure 9B:
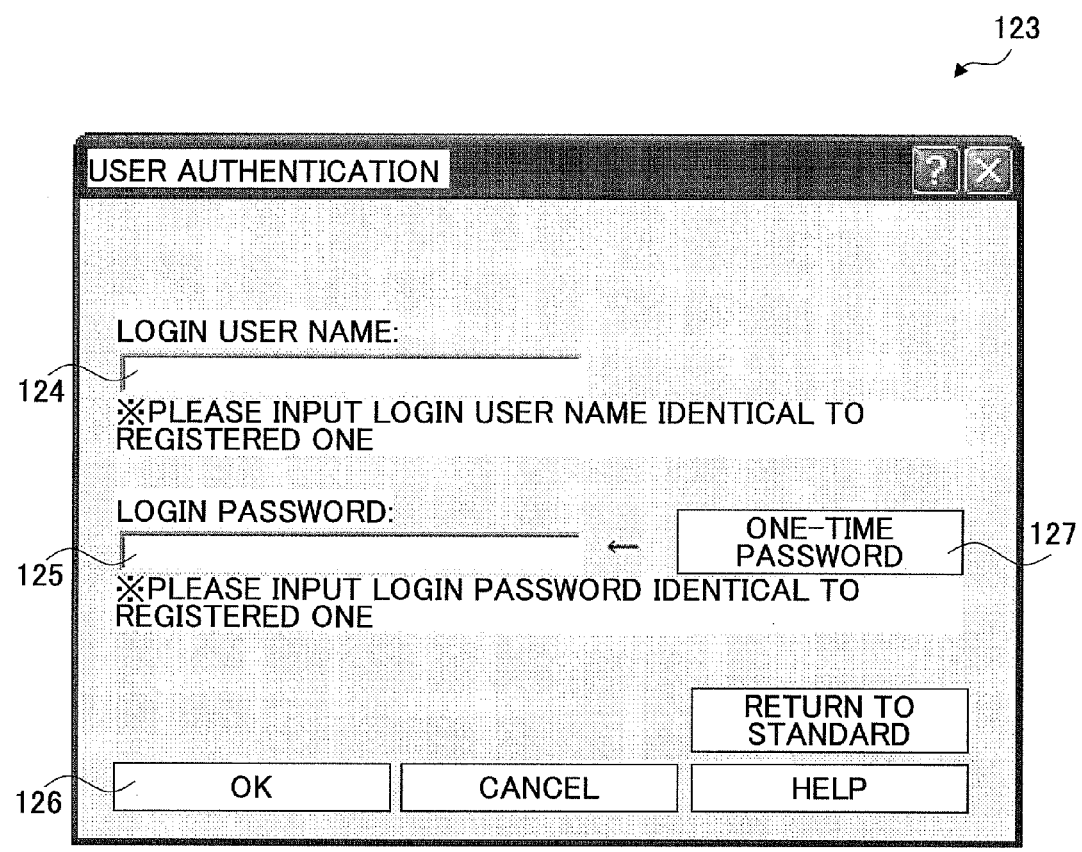

FIG. 9A shows an example of a print setting screen 121 when the target device 2 is a printer. As shown in FIG. 9A, the print setting screen 121 includes various setting items so that the user can select any of various kinds of print setting. Among the setting items, the item for setting up the authentication information of the printer driver is present. When the button "detail of printing method" 122 in the print setting screen 121 is pressed, a user authentication screen 123 as shown in FIG. 9B is displayed. In the user authentication screen 123, the user is prompted to input a login user name and a password to a user name input column 124 and a password input column 125, respectively, in order to use the target device 2.

Referring back to FIG. 8, the user interface part 104 of the driver 103 monitors the user's operation by the keyboard or the mouse (step S103). According to the content of the user's operation, the process is branched as in the following.

When displaying of the user authentication UI is requested by the user, the user interface part 104 of the driver 103 displays the user interface, such as a user authentication screen (step S104) and returns to the monitoring of the user's operation (step S103).

When the button "detail of printing method" 122 in the print setting screen 121 of FIG. 9A is pressed in the step S103, the user authentication screen 123 shown in FIG. 9B is displayed. In the user authentication screen 123, a one-time password generation button 127 to generate a one-time password partially or fully is present in addition to the user name input column 124 and the password input column 125.

Referring back to FIG. 8, when manual input of a normal password is requested by the user in the step S103, the user interface part 104 of the driver 103 receives the user name and the password input by the user (step S105) and returns to the monitoring of the user's operation (step S103).

When generation of a one-time password is requested by the user (or when the one-time password generation button 127 shown in FIG. 9B is pressed) in the step S103, the user interface part 104 of the driver 103 generates a one-time password by using one of the one-time password generation parts 105A, 105B, . . . (step S106). At this time, which kind of the one-time password is to be generated in the step S106 may be determined according to the information of the kind of OTP stored in the driver 103 corresponding to the driver or the user. Alternatively, which kind of the one-time password is to be generated in the step S106 may be determined by communicating with the target device 2 and acquiring the kind of OTP corresponding to the input user name.

Alternatively, a radio button or a drop box to set up the kind of one-time password may be provided in the user interface separately from the one-time password generation button 127. Further, when the information managed by the target device 2 is used at the time of generating the one-time password, the user terminal device 1 may communicate with the target device 2 suitably and acquire the required information.

Subsequently, the user interface part 104 of the driver 103 inserts the generated one-time password in the password input column 125 in the user authentication screen 123 (step S107). Hence, the user can easily use the one-time password. To prevent the password on the screen from being viewed by an unauthorized person, it is desirable that the display indication is replaced by an alternative character string (such as "******", "#####", etc.). When only a part of the one-time password is generated and inserted, the remaining fixed portion of the one-time password may be further input from the keyboard. If the one-time password generated by the external one-time password generation/display device (token) 4 is used in the step S107, the security level may become higher.

Subsequently, the user interface part 104 of the driver 103 receives the input of "OK" or "CANCEL" from the user (step S108) and returns to the monitoring of the user's operation (step S103). When such cancellation is received, the user interface part 104 of the driver 103 clears the one-time password inserted.

When processing of other setting is requested by the user in the step S103, the user interface part 104 of the driver 103 performs the process according to the content of the other setting (step S109) and returns to the monitoring of the user's operation (step S103).

When the input of final "OK" or "CANCEL" by the user is received in the step S103, the end process corresponding to application or cancellation of the function setting is performed (step S110). The function setting process is also terminated (step S111). Alternatively, the end process may be performed by transmitting the print conditions to the target device 2 together with the authentication information (password, user ID). Alternatively, the authentication information may be independently transmitted to the target device 2 in response to a print start request or the like.

FIG. 10 is a flowchart for explaining a function setting process performed by the driver 103 of the user terminal device 1. Specifically, the process performed by the password-associated function setting part 106 of the driver 103 is illustrated. It is assumed that the driver 103 is used as a printer driver.

As shown in FIG. 10, upon start of the process (step S201), the password-associated function setting part 106 determines whether a normal password or a one-time password is to be used (step S202). At the time of inputting the user authentication information, the user may input a one-time password or a normal password. Hence, the process is branched according to the selection of the one-time password or the normal password. When the normal password is used, the security level becomes comparatively low. When the one-time password is used, the security level becomes comparatively high.

When the normal password is used, the password-associated function setting part 106 forcefully sets the color mode of the print setting to the monochrome mode (step S203), and the process is terminated (step S208). Because color printing is expensive, in the case of the normal password whose security level is comparatively low, execution of the printing job in the color mode is avoided.

When the one-time password is used, the password-associated function setting part 106 determines what kind the one-time password is (step S204). The kind of the one-time password may be acquired from the information when the one-time password is generated.

When the kind of the one-time password is indicated by "T" (the kind of OTP which is determined depending on the current time), the password-associated function setting part 106 forcefully sets the color mode of the print setting to the monochrome mode if the current time is within non-working office hours, for example (step S205) and the process is terminated (step S208). This kind of the one-time password may easily remind the user of the facts that the password is determined depending on the current time and the restriction is present by the current time.

When the kind of the one-time password is indicated by "N" (the kind of OTP which is determined depending on the number of times of use of the target device 2), the password-associated function setting part 106 forcefully sets the color mode of the print setting to the monochrome mode if the number of times of use of the target device 2 by the user reaches a predetermined upper limit, for example (step S206) and the process is terminated (step S208). This kind of the one-time password may easily remind the user of the facts that the password is determined depending on the use frequency of the target device 2 by the user and the restriction is present by the use frequency.

When the kind of the one-time password is indicated by "1" (the kind of OTP which is determined depending on the random number), the password-associated function setting part 106 forcefully sets the color mode of the print setting to the monochrome mode at random (step S207) and the process is terminated (step S208). This kind of the one-time password may easily remind the user of the facts that the password is determined depending on the random number and the restriction is present at random.

As described above, the information processing device of this embodiment has the following advantages.

(1) The one-time password generation function and the normal driver function are provided in the driver of the information processing device independently of each other and the driver is arranged to generate a one-time password. It is no longer necessary to separately prepare a dedicated one-time password generation hardware or software module. It is thus possible to provide an enhanced security level while preventing unauthorized use of target devices.

(2) Because the one-time password is generated by the driver of the information processing device, the user can determine the function setting of a printing, fax or scanner function of the target device concerned, continuously with the user authentication, and it is possible to provide improved convenience for the user.

(3) In the information processing device, the function setting of the one-time password associated functions can be determined to present the restriction to the use of the functions and it is possible to contribute to the reduction of the TCO (total cost of ownership).

As described in the foregoing, in the information processing device of the embodiment of the present disclosure, the one-time password generation function is provided in the driver installed for all the users to use the target device, and a one-time password can be used for a wide variety of applications without separately preparing a dedicated hardware, software or web service module.

The present disclosure is not limited to the specifically disclosed embodiments, and variations and modifications may be made without departing from the scope of the present disclosure.

The present application is based upon and claims the benefit of priority of Japanese patent application No. 2011-000278, filed on Jan. 4, 2011, the contents of which are incorporated herein by reference in their entirety.

What is claimed is:

1. An information processing device that is connected to a target device, the information processing device comprising:
   a storage part that stores a one-time password generation method in association with identification information for identifying a user;
   an accepting part that accepts an input of a setting of the target device and an input of identification information for user authentication, wherein the setting of operation of the target device can be determined by the user authetication;
   an acquisition part that acquires, from the target device, relevant information for generating a one-time password according to the one-time password generation method stored in association with the identification information accepted by the accepting part;
   a generation part that generates the one-time password based on the relevant information for generating the one-time password acquired by the acquisition part; and
   a transmission part that transmits, from the information processing device to the target device, the one-time password generated by the generation part, the identification information accepted by the accepting part, and the setting of operating the target device accepted by the accepting part so that the user authentication can be performed by the target device for further operations.

2. The information processing device as claimed in claim 1, wherein
   the acquisition part acquires a number of times of use of the target device; and
   the generation part generates the one-time password based on the number of times of use of the target device acquired by the acquisition part.

3. The information processing device as claimed in claim 1, wherein
   the acquisition part acquires a start time or a use time of the target device; and
   the generation part generates the one-time password based on the start time or the use time acquired by the acquisition part.

4. The information processing device as claimed in claim 1, wherein
   the accepting part accepts an input of a password; and
   the transmission part transmits, to the target device, the password, the identification information accepted by the accepting part, and the setting accepted by the accepting part when the accepting part accepts the input of the password.

5. A method of controlling an information processing device that is connected to a target device, the method comprising:
   storing, by a storage part, a one-time password generation method in association with identification information for identifying a user;
   accepting, by an accepting part, an input of a setting of the target device and an input of identification information for user authentication, wherein the setting of operation of the target device can be determined by the user authentication;
   acquiring, by an acquisition part, from the target device, relevant information for generating a one-time password according to the one-time password generation method stored in association with the identification information accepted by the accepting part;
   generating, by a generation part, the one-time password based on the relevant information for generating the one-time password acquired by the acquisition part; and
   transmitting, by a transmission part, from the information processing device to the target device, the one-time password generated by the generation part, the identification information accepted by the accepting part, and the setting of operating the target device accepted by the accepting part so that the user authentication can be performed by the target device for further operations.

6. A non-transitory computer-readable recording medium storing a program which, when executed by a computer of the information processing device which performs information processing, causes the computer to perform a method of controlling the information processing device, the method comprising:
   storing, by a storage part, a one-time password generation method in association with identification information for identifying a user;
   accepting, by an accepting part, an input of a setting of the target device and an input of identification information for user authentication, wherein the setting of operation of the target device can be determined by the user authentication;
   acquiring, by an acquisition part, from the target device, relevant information for generating a one-time password according to the one-time password generation method stored in association with the identification information accepted by the accepting part;
   generating, by a generation part, the one-time password based on the relevant information for generating the one-time password acquired by the acquisition part; and
   transmitting, by a transmission part, from the information processing device to the target device, the one-time password generated by the generation part, the identification information accepted by the accepting part, and the setting, of operating the target device accepted by the accepting part so that the user authentication can be performed by the target device for further operations.

* * * * *